(12) United States Patent
Nishimura et al.

(10) Patent No.: US 7,768,502 B2
(45) Date of Patent: Aug. 3, 2010

(54) METHOD, APPARATUS, AND SOFTWARE PROGRAM FOR PROCESSING INFORMATION

(75) Inventors: Takanori Nishimura, Kanagawa (JP); Takashi Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 1084 days.

(21) Appl. No.: 11/122,616

(22) Filed: May 5, 2005

(65) Prior Publication Data
US 2005/0248545 A1 Nov. 10, 2005

(30) Foreign Application Priority Data
May 7, 2004 (JP) ............................ P2004-138868

(51) Int. Cl.
*G09G 3/36* (2006.01)
(52) U.S. Cl. ...................................... 345/173; 345/594
(58) Field of Classification Search ................. 345/158, 345/173, 536, 660, 684, 341; 715/785, 798–800
See application file for complete search history.

(56) References Cited

U.S. PATENT DOCUMENTS

| | | | | |
|---|---|---|---|---|
| 5,455,906 A | * | 10/1995 | Usuda | 345/536 |
| 5,867,158 A | * | 2/1999 | Murasaki et al. | 715/785 |
| 6,380,929 B1 | * | 4/2002 | Platt | 345/173 |
| 6,392,661 B1 | * | 5/2002 | Tankersley | 345/660 |
| 6,803,931 B1 | * | 10/2004 | Roman et al. | 715/800 |
| 6,956,590 B1 | * | 10/2005 | Barton et al. | 345/684 |
| 2002/0190947 A1 | * | 12/2002 | Feinstein | 345/158 |

FOREIGN PATENT DOCUMENTS

| | | |
|---|---|---|
| JP | 63-285588 | 11/1988 |
| JP | 6-168068 | 6/1994 |
| JP | 6-259219 | 9/1994 |
| JP | 8-305494 | 11/1996 |
| JP | 9-68954 | 3/1997 |
| JP | 2002-328040 | 11/2002 |
| JP | 2004-127048 | 4/2004 |

* cited by examiner

*Primary Examiner*—Amare Mengistu
*Assistant Examiner*—Yuk Chow
(74) *Attorney, Agent, or Firm*—Oblon, Spivak, McClelland, Maier & Neustadt, L.L.P.

(57) ABSTRACT

An information processing apparatus includes a display having a display screen with a display-enabled display window, and a tablet having predetermined coordinates and permitting handwriting. A predetermined process is performed on the display window presented on the display in response to an operation on the tablet, and a size of the display window is updatable. The coordinates of the tablet are converted in response to the size updating of the display window presented on the display screen. If a portion of the display window is hidden in response to the display window becoming larger in size than the display screen, a peripheral portion of the tablet corresponding to the hidden portion of the display window is set as a movement operation area where the movement of the display window is controlled.

15 Claims, 14 Drawing Sheets

METHOD, APPARATUS, AND SOFTWARE PROGRAM FOR PROCESSING INFORMATION

CROSS REFERENCES TO RELATED APPLICATIONS

The present invention contains subject matter related to Japanese Patent Application JP 2004-138868 filed in the Japanese Patent Office on May 7, 2004, the entire contents of which are incorporated herein by reference.

BACKGROUND OF THE INVENTION

1. Field of the Invention

The present invention is directed to a method, apparatus, and software program for processing information. In particular, the present invention is directed to an information processing apparatus that sets a predetermined area of a tablet as a predetermined operation area on a display during updating of a size of a display window on a screen of the display in order to enhance the ease of use.

2. Description of the Related Art

Information processing apparatuses, such as personal computers, are typically provided with a display and a variety of information is displayed the display.

Some information processing apparatuses having the display thereof permit a user to perform a variety of operations including a selection operation and an input operation by using a finger or an input pen on the display screen of the display. The input operation is performed using the input pen on a tablet (touchpanel) having predetermined coordinates.

One type of information processing apparatuses includes a display and a tablet arranged separately from each other. Another type of information processing apparatuses includes a display and a tablet integrated with each other as disclosed in Japanese Unexamined Patent Application Publication No. 2001-312340.

If an operation is performed onto a desired point on the tablet using an input pen in such an information processing apparatus, a process responsive to the operation on the tablet by the input pen, for example, inputting of a character is performed.

SUMMARY OF THE INVENTION

In the information processing apparatus, the display provides a plurality of resolutions. With a scale of a display window expanded or contracted, the size of the display window is modified with respect to the maximum area of the display screen.

When the size of the display window is modified to a size larger than the display screen of the display, the display window is not entirely shown in a panning state in which a portion of the display window fails to fit into the display screen.

When such a panning state occurs in a known information processing apparatus with the display screen failing to show one of the left peripheral portion and the right peripheral portion of the display window, the user may tap in one of a left portion and a right portion of the tablet in an attempt to process in the one of the left peripheral portion and the right peripheral portion. In this case, a process is performed on one of a left portion and a right portion as a hidden portion of the display window not displayed on the display screen, because coordinates of the tablet are mapped to the entire screen of the display. If one of a top portion and a bottom portion of the display window is not displayed on the display screen in the panning state, the one of the top portion and the bottom portion as a hidden portion of the display window is processed if the user taps one of a top portion and a bottom portion of the tablet.

In this way, a process is not performed on a portion of the display window the user intends.

When a panning state occurs, the user is required to move the display window to cause a hidden portion to appear within the display screen of the display.

The display window can be moved by moving a pointer of a pointing device, such as a mouse, having relative coordinates, outwardly from within the display window. However, this movement cannot be performed using the tablet that is an absolute coordinate pointing device.

The user is thus required to change from the input pen to the mouse each time to move the display window. Such an operation inconveniences the user.

When the display window is modified to a size smaller than the display screen, the entire display window is shown, but an unfilled portion appears surrounding the display window in the display screen.

If the unfilled portion appears in the known information processing apparatus, a process intended by the user cannot be performed on an area of the display screen intended by the user because the coordinate system of the tablet is mapped to the entire display screen.

The unfilled portion of the display screen caused as a result of scale contraction to the display window becomes a useless area that serves no purposes for the user.

In the information processing apparatus, the information processing method, and the software program, it is desirable to provide ease of use at the size updating of the display window.

In an information processing apparatus of one embodiment of the present invention, the coordinates of the tablet are converted in response to the size updating of the display window presented on the display screen. If a portion the display window is hidden in response to the display window becoming larger in size than the display screen, a peripheral portion of the tablet corresponding to the hidden portion of the display window is set as a movement operation area where the movement of the display window is controlled.

An information processing method in accordance with one embodiment of the present invention includes steps of converting the coordinates of the tablet in response to the size updating of the display window presented on the display screen, and upon a portion of the display window being hidden in response to the display window becoming larger in size than the display screen, setting a peripheral portion of the tablet corresponding to the hidden portion of the display window as a movement operation area where the movement of display window is controlled.

A software program of an information processing apparatus in accordance with one embodiment of the present invention includes steps of converting the coordinates of the tablet in response to the size updating of the display window presented on the display screen, and upon a portion of the display window being hidden in response to the display window becoming larger in size than the display screen, setting a peripheral portion of the tablet corresponding to the hidden portion of the display window as a movement operation area where the movement of the display window is controlled.

In the image processing apparatus, the image processing method, and the software program in accordance with embodiments of the present invention, an operation position on the display window coincides with an operation position on the tablet, and the display window is moved in response to an operation on the movement operation area.

In an information processing apparatus of one embodiment of the present invention, the coordinates of the tablet are converted in response to the size updating of the display window presented on the display screen. If an unfilled portion is caused in the display screen in response to the display window becoming smaller in size than the display screen, a portion of the tablet corresponding to the unfilled portion of the display screen is set as a special operation area that enables a predetermined process to be performed on the display window.

An information processing method of an information processing apparatus in accordance with one embodiment of the present invention includes steps of converting the coordinates of the tablet in response to the size updating of the display window presented on the display screen, and upon an unfilled portion being caused in the display screen in response to the display window becoming smaller in size than the display screen, setting a portion of the tablet corresponding to the unfilled portion of the display screen as a special operation area that enables a predetermined process to be performed on the display window.

A software program of an information processing apparatus in accordance with one embodiment of the present invention includes steps of converting the coordinates of the tablet in response to the size updating of the display window presented on the display screen, and upon an unfilled portion being caused in the display screen in response to the display window becoming smaller in size than the display screen, setting a portion of the tablet corresponding to the unfilled portion of the display screen as a special operation area that enables a predetermined process to be performed on the display window.

In the image processing apparatus, the image processing method, and the software program in accordance with embodiments of the present invention, an operational position on the display window coincides with an operation position on the tablet, and a predetermined process on the display window is performed in response to an operation on the special operation area.

An information processing apparatus of one embodiment of the present invention includes a display having a display screen with a display-enabled display window, and a tablet having predetermined coordinates and permitting handwriting, a predetermined process being performed on the display window presented on the display in response to an operation on the tablet, a size of the display window being updatable, the coordinates of the tablet being converted in response to the size updating of the display window presented on the display screen, and upon a portion of the display window being hidden in response to the display window becoming larger in size than the display screen, a peripheral portion of the tablet corresponding to the hidden portion of the display window being set as a movement operation area where the movement of the display window is controlled.

The position manipulated by the user on the tablet coincides with the corresponding position on the display window, and the predetermined process intended by the user is performed.

Since the display window is moved in response to the operation on the movement operation area on the tablet, the user is freed from manipulating a relative coordinate pointing device such as a mouse. This arrangement eliminates the need for the user to hold and manipulate the mouse each time the user intends to move the display window. The ease of use of the information processing apparatus is substantially enhanced.

In accordance with one embodiment of the present invention, the display and the tablet may be integrated into one unitary module. With this arrangement, manipulating the input pen on the display screen to move the display window is identical to an operation on the tablet. The ease of use and the reliability of operation are substantially enhanced.

In accordance with another embodiment of the present invention, an orientation of the display window may be modified with respect to the display, and an orientation of the coordinates of the tablet may be modified with respect to a change in the orientation of the display window. With this arrangement, the point manipulated by the user coincides with the point on the display window. For example, the user is freed from an inconvenience that a process is erroneously performed on a preceding point prior to the updating of the orientation instead of a point intended by the user on the display window. A predetermined process is thus correctly performed as intended by the user.

In accordance with yet another embodiment, the movement speed on the display window may be updated in response to the operation position on the movement operation area on the tablet. The user can move the display window at a desired speed by selecting the operation position within the movement operation area on the tablet. The ease of use of the information processing apparatus is thus enhanced in terms of the movement of the display window.

One embodiment of the present invention is related to an information processing method of an information processing apparatus including a display having a display screen with a display-enabled display window, and a tablet having predetermined coordinates and permitting handwriting, presented on the display in response to an operation on the tablet, and a size of the display window being updatable. The information processing method includes steps of converting the coordinates of the tablet in response to the size updating of the display window presented on the display screen, and upon a portion of the display window being hidden in response to the display window becoming larger in size than the display screen, setting a peripheral portion of the tablet corresponding to the hidden portion of the display window as a movement operation area where the movement of the display window is controlled.

The position manipulated by the user on the tablet coincides with the corresponding position on the display window, and the predetermined process intended by the user is performed.

Since the display window is moved in response to the operation on the movement operation area on the tablet, the user is freed from manipulating a relative coordinate pointing device such as a mouse. This arrangement eliminates the need for the user to hold and manipulate the mouse each time the user intends to move the display window. The ease of use of the information processing apparatus is substantially enhanced.

One embodiment of the present invention is relates to a software program of an information processing apparatus including a display having a display screen with a display-enabled display window, and a tablet having predetermined coordinates and permitting handwriting, a predetermined process being performed on the display window presented on the display in response to an operation on the tablet, and a size of the display window being updatable. The software program includes steps of converting the coordinates of the tablet in response to the size updating of the display window presented on the display screen, and upon a portion of the display window being hidden in response to the display window becoming larger in size than the display screen, setting a peripheral portion of the tablet corresponding to the hidden portion of the display window as a movement operation area where the movement of the display window is controlled.

The position manipulated by the user on the tablet coincides with the corresponding position on the display window, and the predetermined process intended by the user is performed.

Since the display window is moved in response to the operation on the movement operation area on the tablet, the user is freed from manipulating a relative coordinate pointing device such as a mouse. This arrangement eliminates the need for the user to hold and manipulate the mouse each time the user intends to move the display window. The ease of use of the information processing apparatus is substantially enhanced.

An information processing apparatus of one embodiment of the present invention includes a display having a display screen with a display-enabled display window, and a tablet having predetermined coordinates and permitting handwriting. A predetermined process is performed on the display window presented on the display in response to an operation on the tablet. A size of the display window is updatable. The coordinates of the tablet are converted in response to the size updating of the display window presented on the display screen. If a portion of the display screen is left unfilled with the display window in response to the display window becoming smaller in size than the display screen, a portion of the tablet corresponding to the unfilled portion of the display screen is set as a special operation area that enables a predetermined process to be performed on the display window.

The position manipulated by the user on the tablet coincides with the corresponding position on the display window, and the predetermined process intended by the user is performed.

With the special operation area set up, any area serving no purposes to the user is not present. If a function is assigned to the special operation area, it is not necessary to particularly open a window of the function. The ease of use of the information processing apparatus is thus enhanced.

One embodiment of the present invention is related to an information processing method of an information processing apparatus including a display having a display screen with a display-enabled display window, and a tablet having predetermined coordinates and permitting handwriting, a predetermined process being performed on the display window presented on the display in response to an operation on the tablet, and a size of the display window being updatable.

The information processing method includes steps of converting the coordinates of the tablet in response to the size updating of the display window presented on the display screen, and upon a portion of the display window being left unfilled with the display window in response to the display window becoming smaller in size than the display screen, setting a portion of the tablet corresponding to the unfilled portion of the display screen as a special operation area that enables a predetermined process to be performed on the display window.

The position manipulated by the user on the tablet coincides with the corresponding position on the display window, and the predetermined process intended by the user is performed.

Since the display window is moved in response to the operation on the movement operation area on the tablet, the user is freed from manipulating a relative coordinate pointing device such as a mouse. This arrangement eliminates the need for the user to hold and manipulate the mouse each time the user intends to move the display window. The ease of use of the information processing apparatus is substantially enhanced.

One embodiment of the present invention is related to a software program of an information processing apparatus including a display having a display screen with a display-enabled display window, and a tablet having predetermined coordinates and permitting handwriting, a predetermined process being performed on the display window presented on the display in response to an operation on the tablet, and a size of the display window being updatable. The software program includes steps of converting the coordinates of the tablet in response to the size updating of the display window presented on the display screen, and upon a portion of the display window being left unfilled with the display window in response to the display window becoming smaller in size than the display screen, setting a portion of the tablet corresponding to the unfilled portion of the display screen as a special operation area that enables a predetermined process to be performed on the display window.

The position manipulated by the user on the tablet coincides with the corresponding position on the display window, and the predetermined process intended by the user is performed.

Since the display window is moved in response to the operation on the movement operation area on the tablet, the user is freed from manipulating a relative coordinate pointing device such as a mouse. This arrangement eliminates the need for the user to hold and manipulate the mouse each time the user intends to move the display window. The ease of use of the information processing apparatus is substantially enhanced.

DESCRIPTION OF THE PREFERRED EMBODIMENTS

An image processing apparatus 1, an image processing method, and a software program in accordance with embodiments of the present invention are described below with reference to the drawings.

The information processing apparatus 1 of embodiments of the present invention is applicable to a variety of information processing apparatuses including a personal computer, a personal digital assistant (PDA), a mobile information terminal, a workstation, and a cellular phone. The information processing method and the software program are widely applicable to the variety of information processing apparatuses as the information processing methods and software program thereof.

Figure 1:
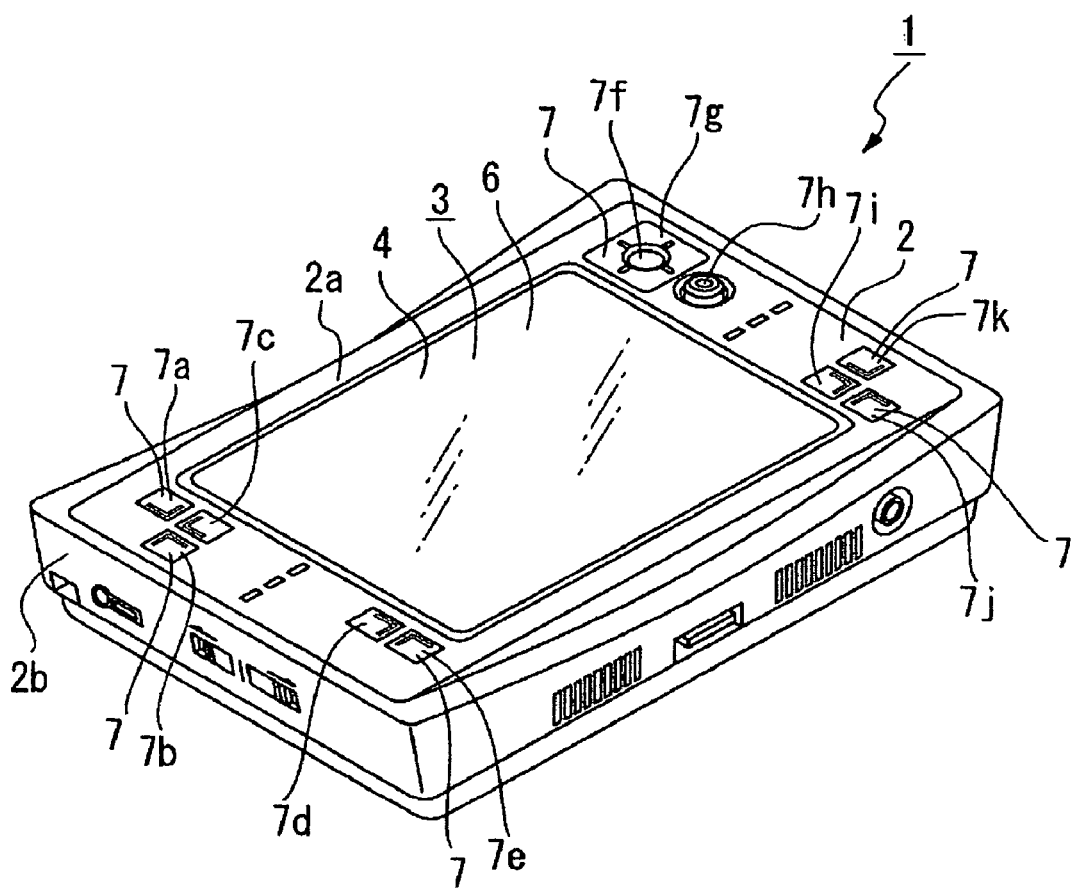
FIG. 1 is a perspective view of an information processing apparatus of one embodiment of the present invention.

The information processing apparatus 1 contains predetermined blocks housed in a casing 2 (see FIG. 1). The casing 2 configured in a flat panel includes, on the front 2a thereof, a display 3 such as a liquid-crystal panel.

The information processing apparatus 1 includes a tablet (touchpanel) 4, having predetermined a coordinate system, integrated with the display 3. A variety of operations including a selection operation and an input operation are performed by tapping a predetermined location on the display window 5, namely, a predetermined location on the tablet 4 presented on the display 3 with a finger (not shown) or a dedicated input pen (stylus) (not shown).

The display 3 includes a display screen 6 exposed on the front 2a of the casing 2 and enabled to present the display window 5. In other words, the display screen 6 is the largest possible area within which the display window 5 is presented.

Figure 2:
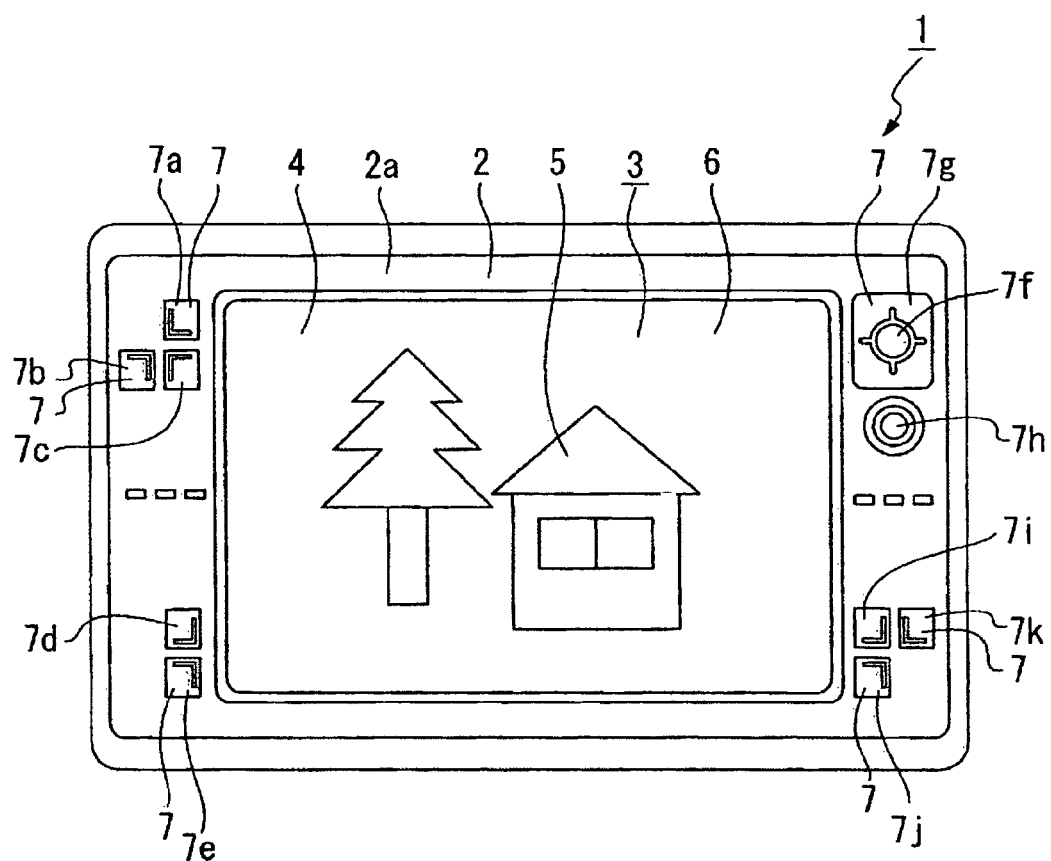
FIG. 2 is a front view of the information processing apparatus with a display window oriented in a landscape mode.

When a variety of software programs installed on the information processing apparatus 1 are executed, the display window 5 presented as shown in FIG. 2 accepts character information, numerical information, symbol information, etc. The display window 5 is displayed by double-clicking, with the finger or the dedicated pen, an icon for executing each of software programs displayed on an initial window presented subsequent to switching on the information processing apparatus 1.

A plurality of control buttons 7 are arranged on the front 2a on the casing 2 (see FIG. 1). The control buttons 7 includes a center button 7a, a left button 7b, a right button 7c, a zoom button 7d, a rotation button 7e, an enter button 7f, a cursor key 7g, a pointing device 7h, a function selection button 7i, a start button 7j, a luminance button 7k, etc.

The center button 7a, the left button 7b, and the right button 7c correspond to respective buttons on the mouse. The zoom button 7d scale expands or scale contracts the display window 5 displayed on the display 3. The rotation button 7e is used to rotate the display window by 90°. The enter button 7f, corresponding to an enter key in a keyboard, is used to enter and execute a command. The cursor key 7g is used to move a cursor displayed on the display 3 up, down, leftward and rightward. The pointing device 7h is used to move a pointer displayed on the display 3. The function selection button 7i is used to adjust the volume of an output signal, or to switch the output signal to an external display. The start button 7j is used to start a particular software program. The luminance button 7k is used to adjust the luminance of the display 3.

Figure 3:
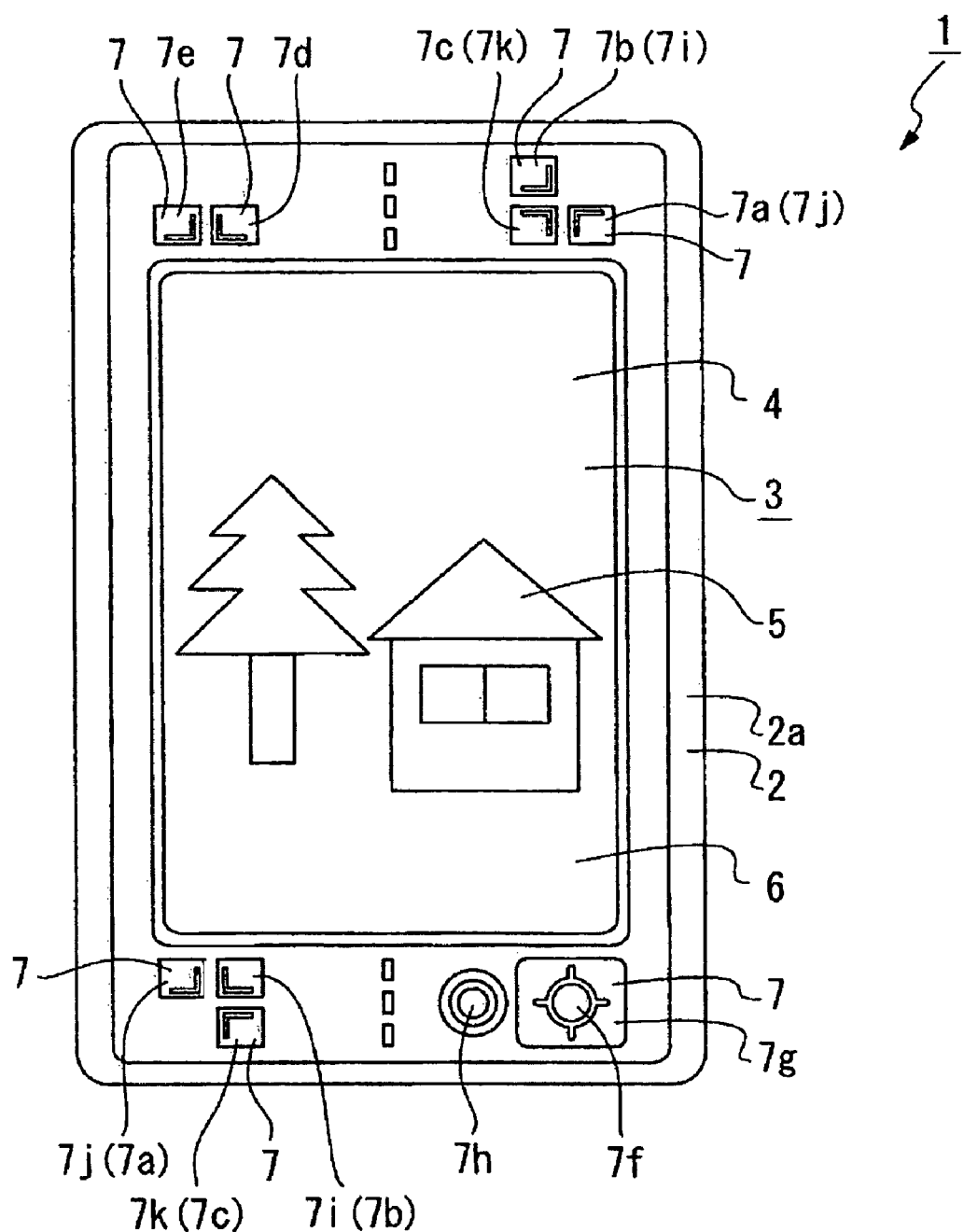
FIG. 3 is a front view of the information processing apparatus with the display window oriented in a portrait mode.

As previously discussed, the display window 5 is rotated by 90° by manipulating the rotation button 7e in the information processing apparatus 1. For example, if the rotation button 7e is manipulated with the screen in a landscape mode as shown in FIG. 2, the display window 5 is rotated by 90° to a portrait mode as shown in FIG. 3. If the rotation button 7e is manipulated with the screen in a portrait mode as shown in FIG. 3, the display window 5 is rotated by 90° to a landscape mode as shown in FIG. 2.

When the orientation of the display window 5 is changed, the coordinates of the tablet 4 integrated with the display 3 is also rotated by 90° with reference to the display window 5. A point on the tablet 4 manipulated by a user coincides with a point on the display window 5. For example, if the user manipulates a point at the top left corner of the display window 5, a process responsive to an operation intended by the user is performed. The user is thus free from any inconvenience that a process corresponding to a point in the bottom left corner, for example, prior to the re-orientation is performed.

When the display window 5 is reoriented from a landscape mode to a portrait mode, the functions of the center button 7a, the left button 7b, and the right button 7c are replaced with the functions of the start button 7j, the function selection button 7i, and the luminance button 7k, respectively. The center button 7a, the left button 7b, and the right button 7c are thus programmed to function as the start button 7j, the function selection button 7i, and the luminance button 7k, respectively. The function selection button 7i, the start button 7j, and the luminance button 7k are programmed to function as the left button 7b, the center button 7a, and the right button 7c, respectively.

The size of the display window 5 presented on the display 3 is modified by manipulating the zoom button 7d in the information processing apparatus 1. The resolutions of the display window 5 are available at five steps: VGA (Video Graphics Array) resolution of 640×480 dots, SVGA (Super Video Graphics Array) resolution of 800×600 dots, XGA (eXtended Graphics Array) of 1024×768 dots, SXGA (Super extended Graphics Array) resolution of 1280×1024 dots, and UXGA (Ultra eXtended Graphics Array) resolution of 1200× 1600 dots.

Figure 4:
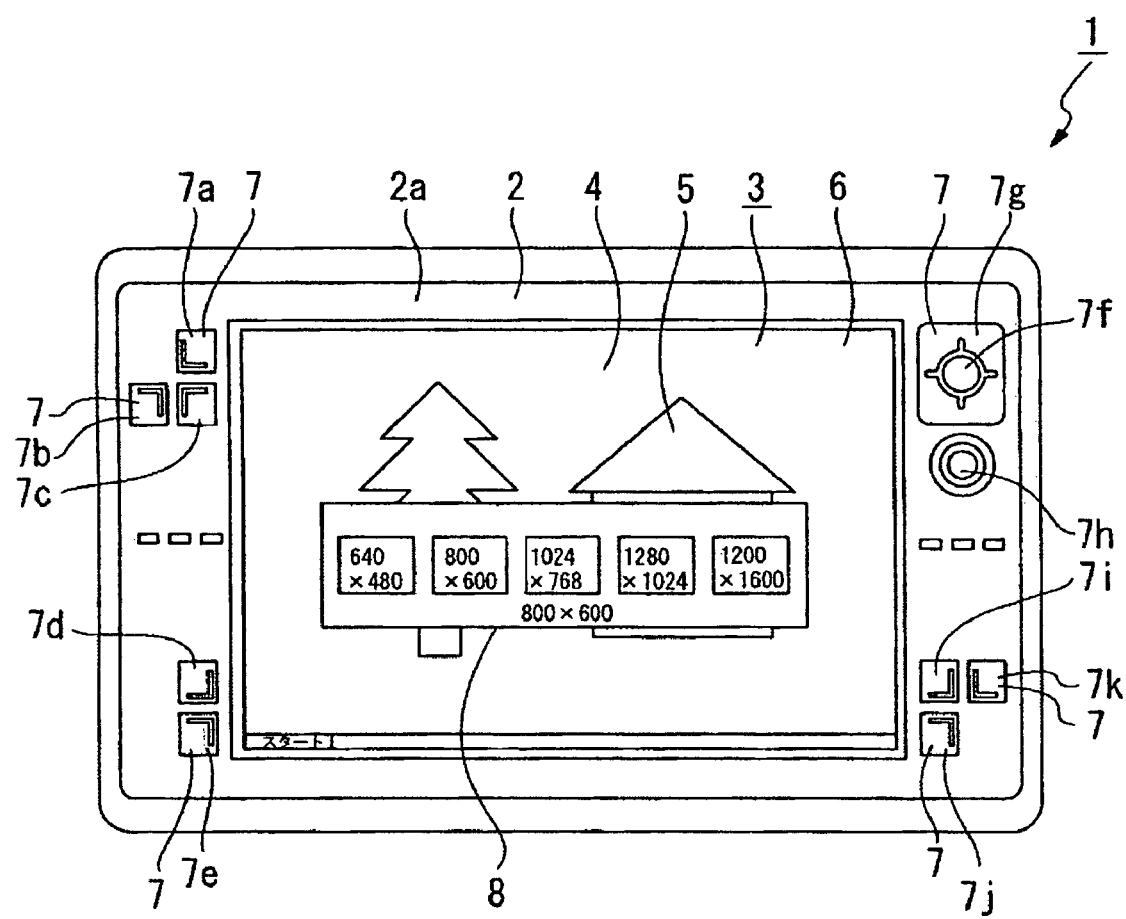
FIG. 4 is a front view of the information processing apparatus with a resolution selection window displayed on a screen thereof.

When the zoom button 7d is selected, a resolution selection window 8 is displayed on the display 3 as shown in FIG. 4. The size of the display window 5 is modified by selecting a desired resolution displayed on the resolution selection window 8. If no resolution is selected when the resolution selection window 8 is displayed on the display 3 in response to a manipulation of the zoom button 7d, the resolution of one of VGA, SVGA, and XGA is automatically selected, for example. The display window 5 is modified in a size different from the size prior to the manipulation of the zoom button 7d.

If one of the resolutions of VGA and SVGA is selected in the information processing apparatus 1, the resolution of the display window 5 becomes lower than the resolution of the display 3 and the size of the display window 5 become smaller than the size of the display screen 6 of the display 3. The entire display window 5 is shown in the display screen 6, and a portion of the display screen 6 remains an unfilled area 6a with no portion of the display window 5 appearing (see FIG. 5).

Figure 6:
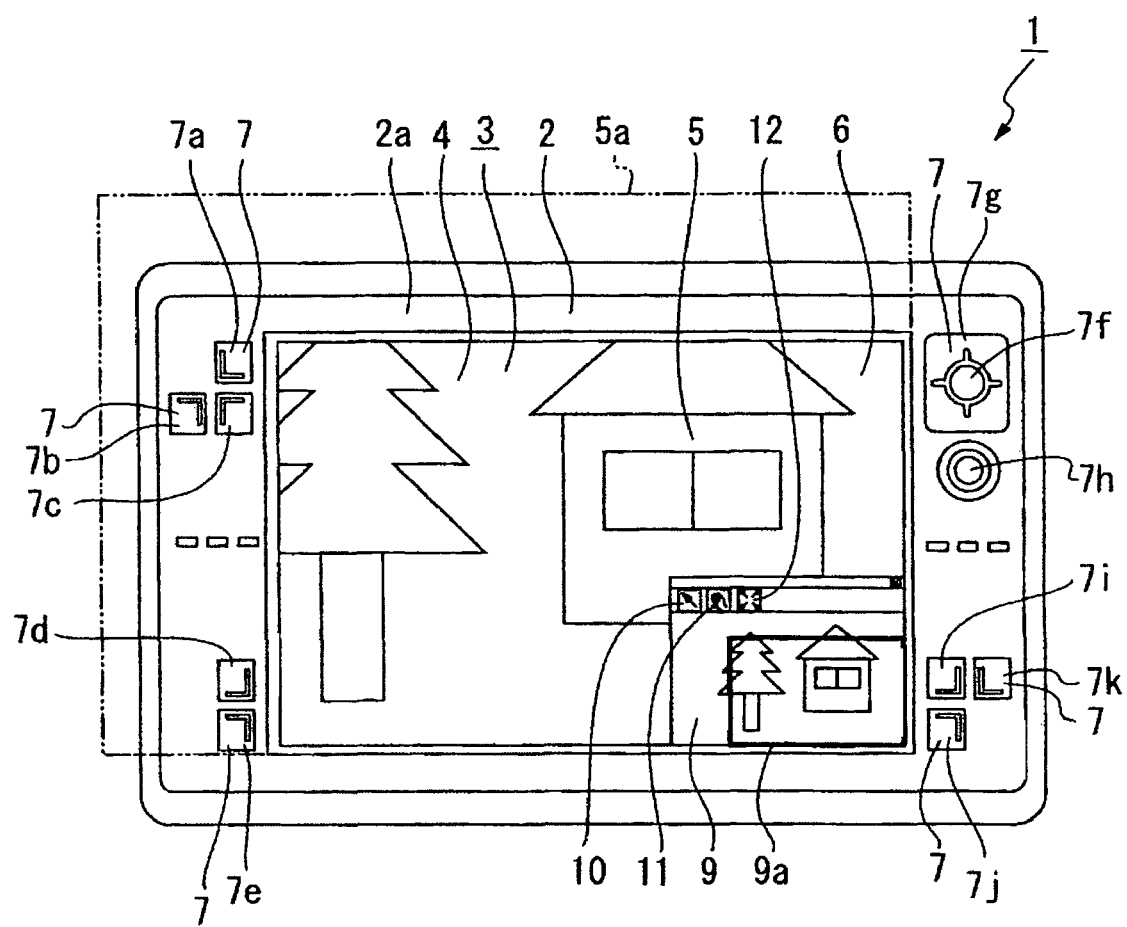
FIG. 6 is a front view of the information processing apparatus in which an auxiliary window appears when the resolution of the display window becomes higher than the resolution of the display.

If one of the resolutions of XGA, SXGA, and UXGA is selected, the resolution of the display window 5 becomes higher than the resolution of the display 3, and the display window 5 is not entirely displayed within the display screen 6 of the display 3 with a portion of the display window 5 hidden in a panning state. An auxiliary window 9 appears then as shown in FIG. 6.

Since the auxiliary window 9 provides a function of displaying a current position of the display window 5 with respect to the display screen 6. The user can monitor the current panning state of the display window 5. The entire display window 5 displayed in the auxiliary window 9 is contracted in scale, and an outline 9a shows the currently displayed area of the current display window 5 in the display screen 6. The user thus learns the currently displayed area of the display window 5 by the outline 9a and an area outside the outline 9a as a hidden portion 5a (the two areas are surrounded a two-dot-and-dash chain line box as shown in FIG. 6).

Displayed on the auxiliary window 9 are a mouse mode selection button 10 for mouse operation, a move mode selection button 11 for picking and dragging the display window 5, and a fit mode selection button 12 for temporarily contracting the display window 5 in accordance with the size of the display screen 6. If any point is clicked on the display window 5 with a fit mode set by the fit mode selection button 12, an original resolution resumes with respect to the clicked point.

Figure 5:
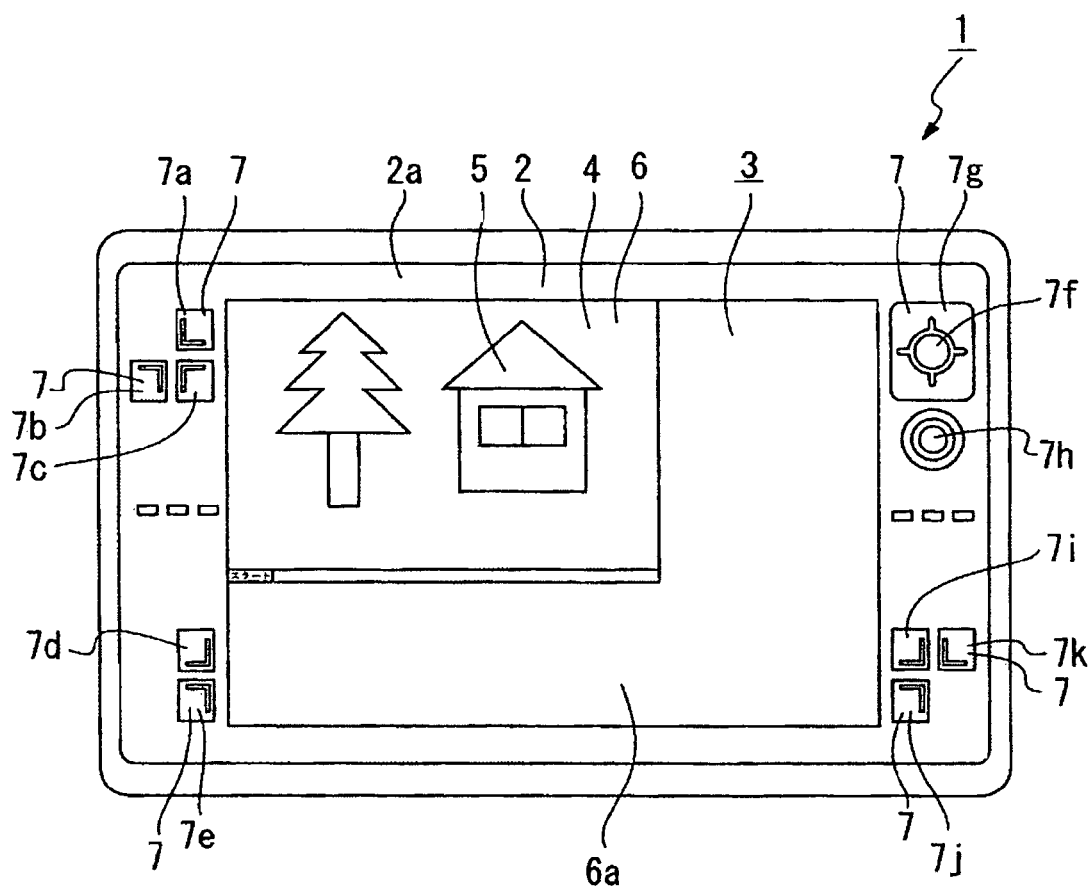
FIG. 5 is a front view of the information processing apparatus in which an unfilled portion appears in the display screen when a resolution of the display window becomes lower than a resolution of a display.

To modify the size of the display window 5, the coordinates of the tablet 4 integrated with the display 3 are converted in accordance with a portion of the display window 5 displayed on the display screen 6 (in a coordinates conversion step). As shown in FIG. 5, for example, when the unfilled area 6a appears with the size of the display window 5 contracted as shown in FIG. 5, coordinates of the tablet 4 are assigned to an area other than the unfilled area 6a of the display screen 6. When the information processing apparatus is in the panning state with the size of the display window 5 expanded as shown in FIG. 6, the coordinates of the tablet 4 are assigned to a displayed portion of the display window 5, namely, an area other than the hidden portion 5a of the display window 5.

A point, on the tablet 4, manipulated by the user thus agrees with a point on the display window 5, and a process intended by the user is performed.

If the display window 5 becomes larger than the display screen 6 in the information processing apparatus 1, a peripheral portion of the tablet 4 corresponding to the hidden portion 5a of the display window 5 is set as a movement operation area 13 for moving the display window 5 (area setting step).

Figure 7:
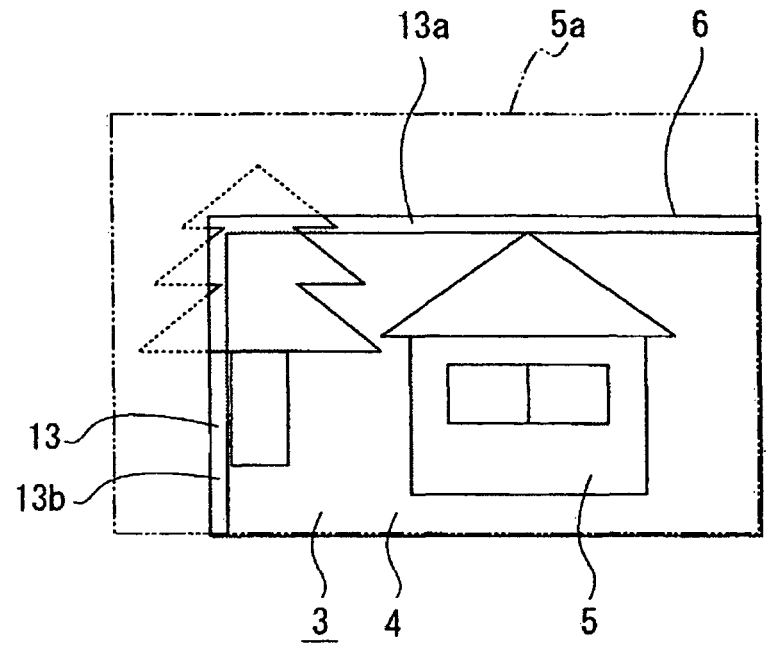
FIG. 7 illustrates a top edge portion and a left-hand edge portion of the tablet, set as movement operation areas.
Figure 8:
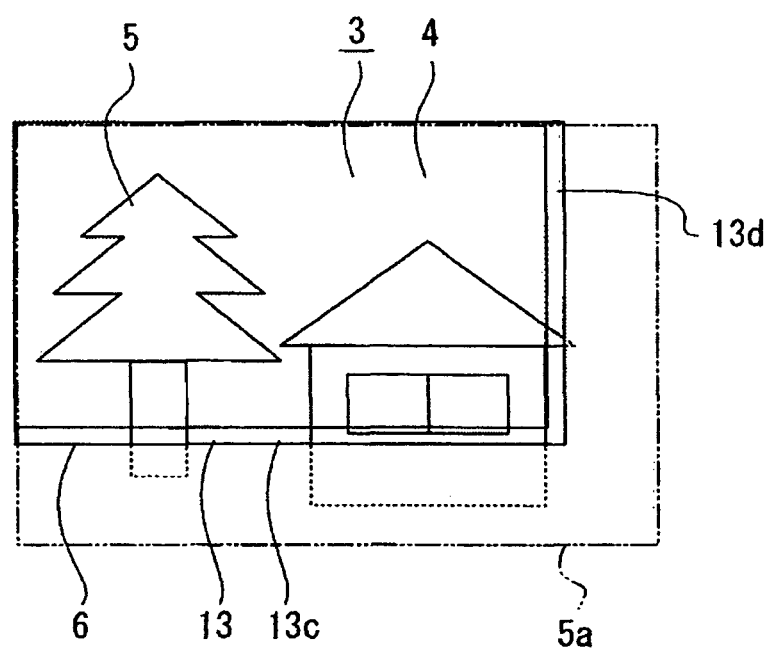
FIG. 8 illustrates a bottom edge portion and a right-hand edge portion of the tablet, set as movement operation areas.

Referring to FIG. 7, if the top edge portion and the left-hand edge portion of the display window 5 are set as the hidden portion 5a, a top edge portion and a left-hand edge portion of the tablet 4 corresponding to the hidden portion 5a are set up as a movement operation area 13a and a movement operation area 13b, respectively. If the bottom edge portion and the right-hand edge portion of the display window 5 are set as the hidden portion 5a as shown in FIG. 8, a bottom edge portion and a right-hand edge portion of the tablet 4 corresponding to the hidden portion 5a are set up as a movement operation area 13c and a movement operation area 13d, respectively.

Figure 9:
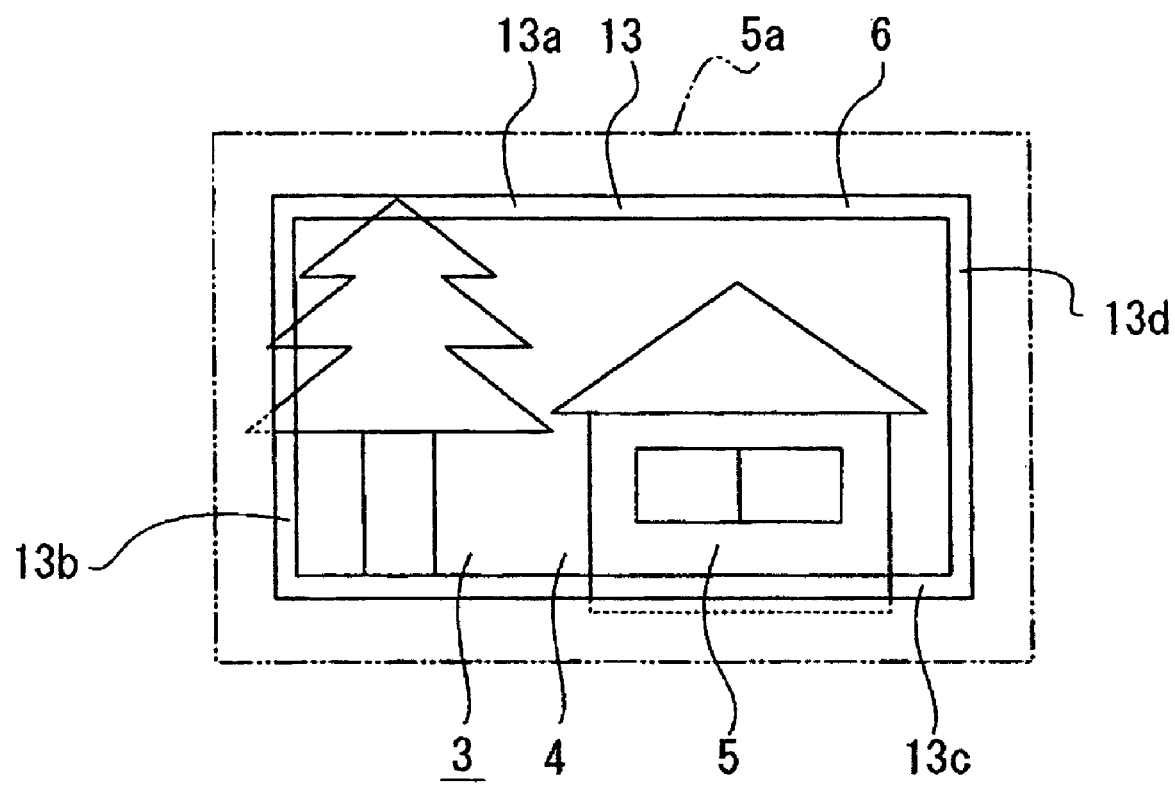
FIG. 9 illustrates top and bottom edge portions and left-hand and right-hand edge portions, set as movement operation areas.

If the entire peripheral portion of the display window 5, namely, the top and bottom edge portions, and the left-hand and right-hand edge portions of the display window 5, are set as the hidden portion 5a as shown in FIG. 9, the top and bottom edge portion and the left-hand and right-hand edge portions of the tablet 4 corresponding to the hidden portion 5a are set as the movement operation areas 13a, 13c, 13b, and 13d, respectively.

Figure 10:
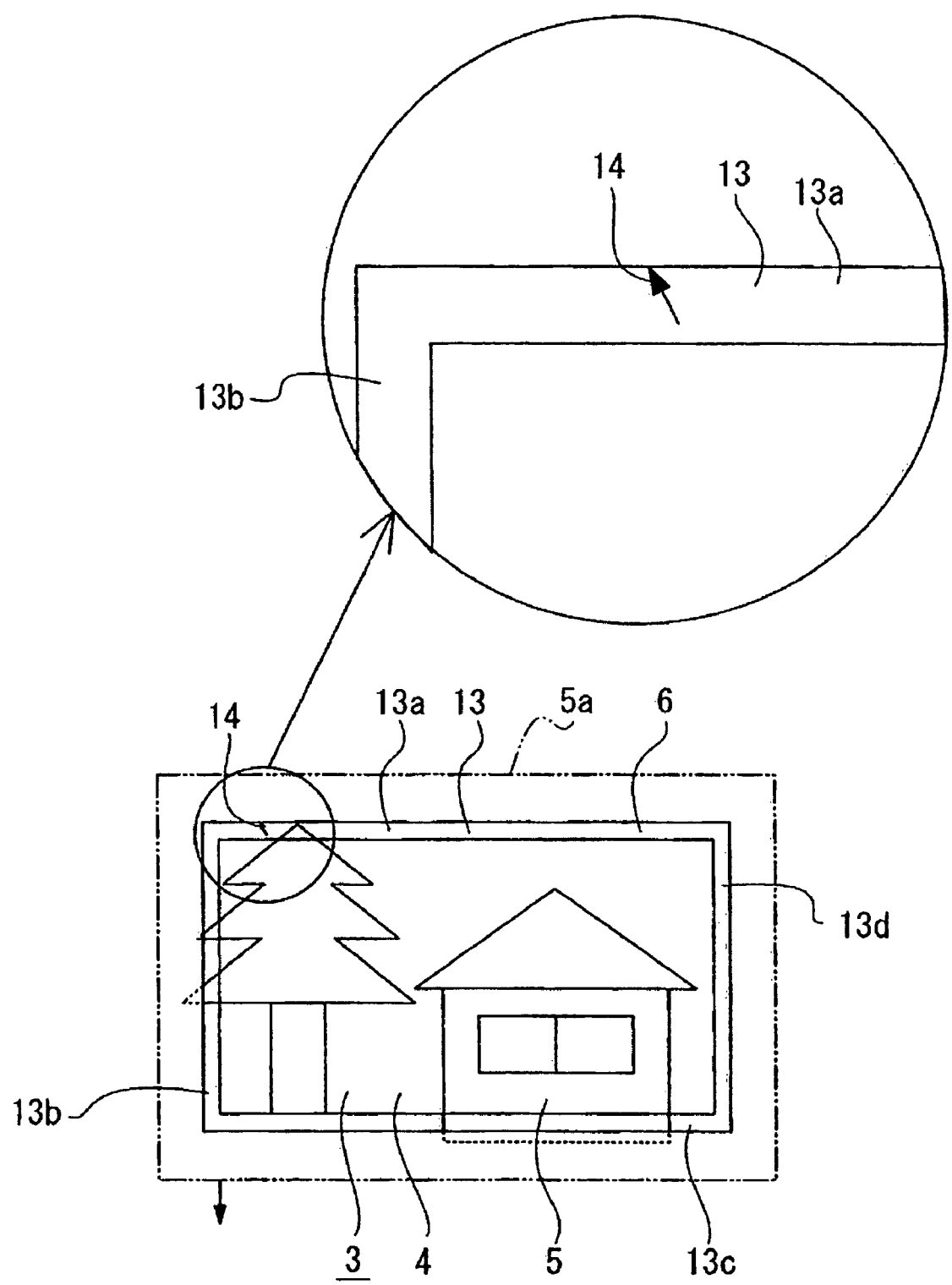
FIG. 10 illustrates a display window that is being moved by manipulating a movement operation area on the tablet.

The display window 5 is moved in any direction by manipulating the movement operation area 13 with a pointer 14 shown on the display window 5. For example, if the pointer 14 is moved to the movement operation area 13a using the pointing device 7h (see FIG. 10), the display window 5 is moved downward, and the upper hidden portion 5a of the display window 5 appears within the display screen 6. Similarly, if one of the movement operation area 13b, the movement operation area 13c, and the movement operation area 13d is moved using the pointer 14, the display window 5 is moved rightward, up or down. Each of the left hidden portion 5a, the bottom hidden portion 5a, and the right hidden portion 5a of the display window 5 appears in the display screen 6.

By manipulating a more outer portion of the movement operation area 13, the display window 5 is moved faster, while by manipulating a more inner portion of the movement operation area 13, the display window 5 is moved more slowly. By selecting an operation position within the movement operation area 13, the user can move the display window 5 at a desired speed. The ease of use of the information processing apparatus 1 in the movement of the display window 5 is thus achieved.

When the display window 5 is smaller in size than the display screen 6, a portion of the display screen 6 corresponding to the unfilled area 6a is set up as a special operation area 15 for performing a predetermined process on the display window 5.

Figure 11:
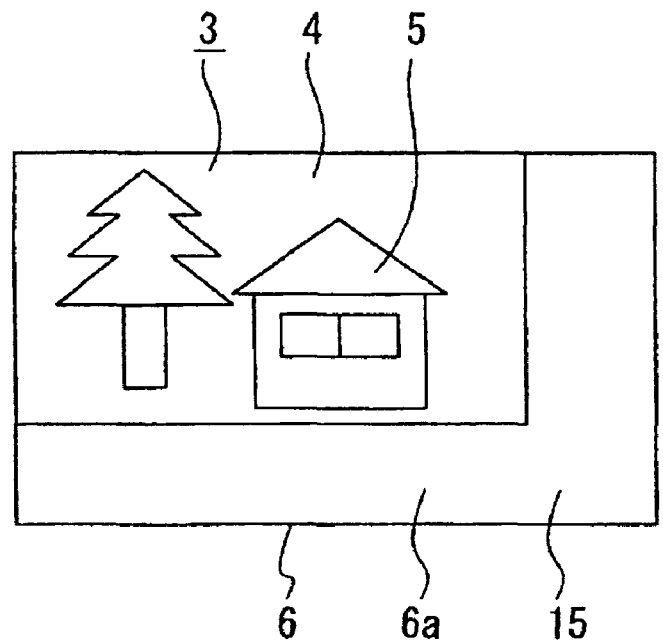
FIG. 11 illustrates a special operation area with the display window set closer to the left-top corner of the display screen.
Figure 12:
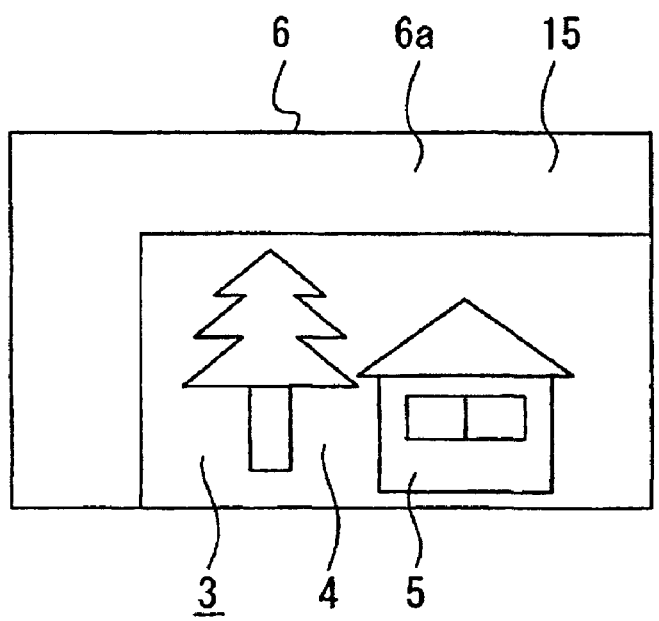
FIG. 12 illustrates the special operation area with the display window closer to the bottom-right corner of the display screen.
Figure 13:
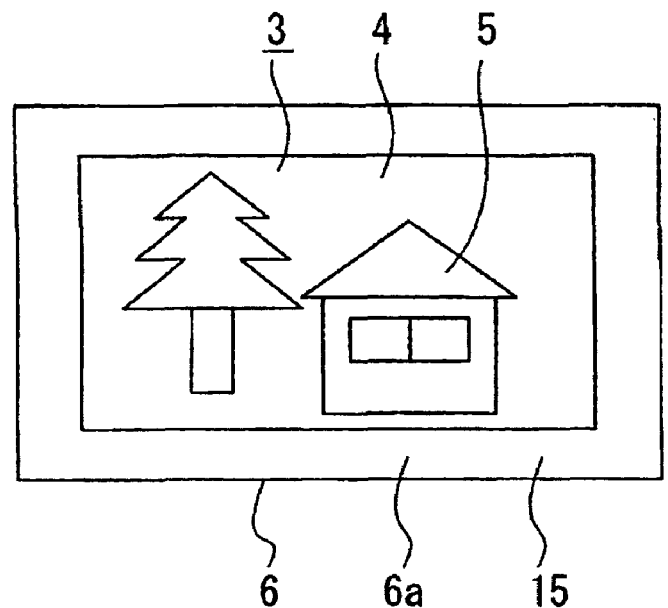
FIG. 13 illustrates the special operation area with the display window centered on the center of the display screen.

If the display window 5 is displayed closer to the top left corner of the display screen 6 as shown in FIG. 11, a portion of the tablet 4 corresponding to the bottom edge portion and the right-hand edge portion of the display window 5 is set up as the special operation area 15. If the display window 5 is displayed closer to the bottom right corner of the display screen 6 as shown in FIG. 12, a portion of the tablet 4 corresponding to the top edge portion and the right-hand edge portion of the display screen 6 is set up as the special operation area 15. If the display window 5 is displayed as centered on the center of the display screen 6 as shown in FIG. 13, the entire peripheral portion of the tablet 4 corresponding to all peripheral portions of the display window 5 is set up as the special operation area 15.

Figure 14:
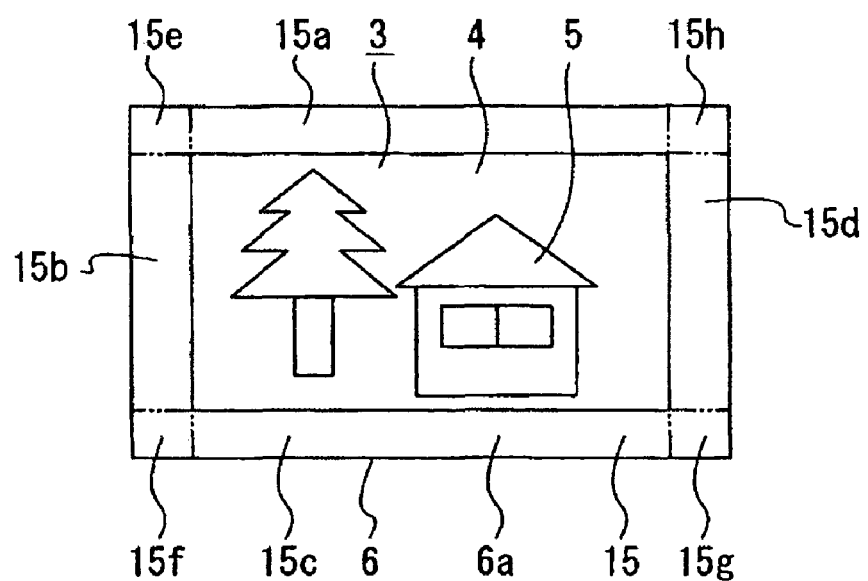
FIG. 14 illustrates a plurality of special operation areas.

The special operation area 15 is divided into a plurality of partitions having different processes assigned thereto. If the display window 5 is displayed as centered on the center of the display screen 6, the special operation area 15 is divided into eight partitions as shown in FIG. 14, namely, four corner partitions 15e, 15f, 15g, and 15h and four partitions 15a, 15b, 15c, and 15d between the corners. By clicking in one of the partitions 15a-15h with the pointer 14, a predetermined process is performed.

If the partition 15a is selected, a "return" function for reverting back to an immediately preceding display window 5 is performed. If the partition 15b is selected, a "proceed" function for proceeding to a next display window 5 is performed. If the partition 15c is selected, a "close" function for closing the display window 5 is performed. If partition 15d is selected, a "software initiation" function for initiating a new software program is performed. Any of the partitions 15e, 15f, 15g, and 15h is selected, a "scroll" function for scrolling the display window 5 in the designated direction is performed.

Since the special operation area 15 is divided into the plurality of partitions having functions respectively assigned thereto, the ease of use of the information processing apparatus is enhanced.

The above functions respectively assigned to the partitions 15a-15h are described above for exemplary purposes only, and functions may be assigned to partitions taking into consideration the user's personal preference. The number of partitions in the special operation area 15 may be set to any value. If the display window 5 is offset toward any point as shown in FIGS. 11 and 12, the special operation area 15 may be divided into three partitions with respect to the corner of the display screen 6.

The special operation area 15 may be a single area rather than being divided into a plurality of partitions.

Functions may be assigned to the special operation area 15 so that a predetermined process is performed in response to the direction and speed of the movement of the pointing device 7h.

Figure 15:
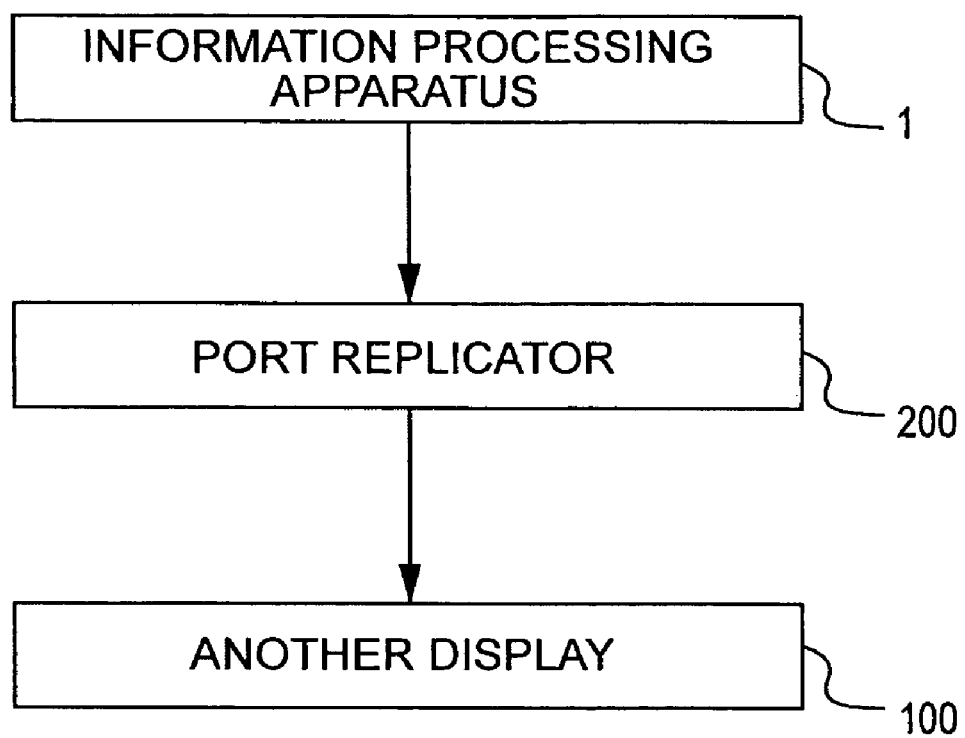
FIG. 15 illustrates another display connected to the information processing apparatus.

The information processing apparatus 1 is connected to another display 100 having a display. Such a display 100 is connected to the information processing apparatus 1 using a port replicator 200 connected to the information processing apparatus 1 (see FIG. 15).

With the information processing apparatus 1 connected to the other display 100, the coordinates of the tablet 4 may be mapped to one of the display window 5 of the information processing apparatus 1 and a display window 5 of the other display 100. Alternatively, the coordinates of the tablet 4 may be mapped to both the display window 5 of the information processing apparatus 1 and the display window 5 of the other display 100.

With the other display 100 connected to the information processing apparatus 1, each process is performed when the orientation and the size of the display window 5 is modified.

The number of other displays 100 is not limited to one. Each of the above processes may be performed even when two or more displays 100 are connected to the information processing apparatus 1.

Figure 16:
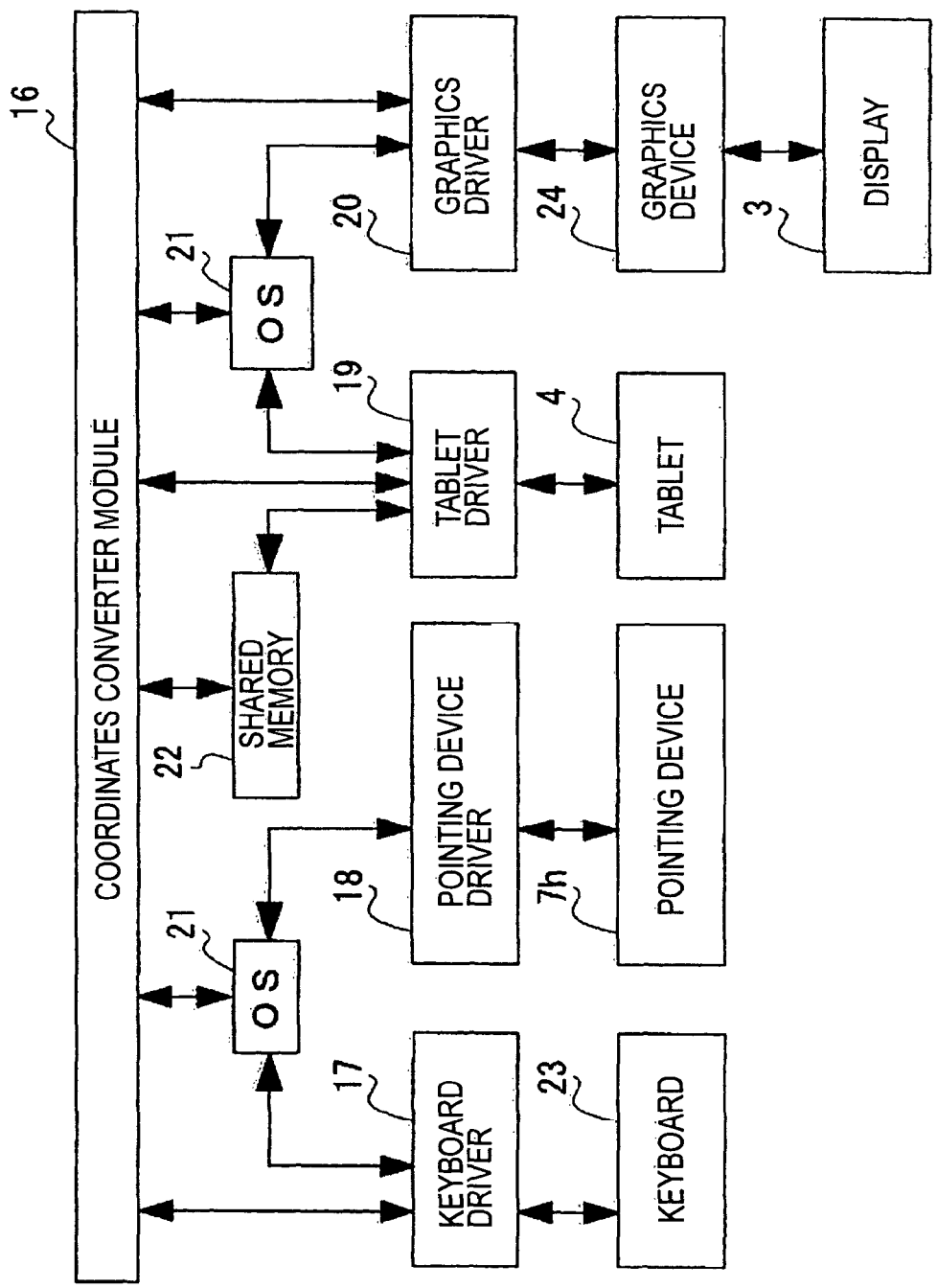
FIG. 16 is a block diagram of the information processing apparatus configured to perform a variety of process on the display window.

Blocks of the information processing apparatus 1 related to the processes performed to the display window 5 are described below (see FIG. 16).

A coordinates converter module 16 is positioned at a software layer. The coordinates converter module 16 controls conversion of the coordinates of the tablet 4. The coordinates converter module 16 communicates with each of a keyboard driver 17, a pointing device driver 18, a tablet driver 19, a graphics driver 20, an OS (operating system) 21 and a shared memory 22. The coordinates converter module 16 thus exchanges required information with each of these blocks. The coordinates converter module 16 is automatically initiated by the OS 21 at the moment the OS 21 starts up.

A virtual keyboard 23 (not shown) displayed on the display screen 6 is controlled by the keyboard driver 17. The keyboard driver 17 receives, from the coordinates converter module 16, a command signal relating to a direction of a cursor displayed on the display window 5. During rotation of the display window 5 in response to an operation on the rotation button 7e, the cursor is converted to have a movement direction matching a direction of the display window 5.

The pointing device 7h is controlled by the pointing device driver 18. The pointing device driver 18 receives, from the coordinates converter module 16, a command signal relating to a direction of the pointer displayed on the display window 5. During the rotation of the display window 5 in response to the operation of the rotation button 7e, the pointer 14 is converted to have a movement direction matching a direction of the display window 5.

The tablet 4 is controlled by the tablet driver 19. The tablet driver 19 receives, from the coordinates converter module 16, an on/off control signal relating to the coordinates conversion. The coordinates of the tablet 4 are converted in response to the orientation and the size of the display window 5 during the rotation of the display window 5 caused in response to the operation to the rotation button 7e and during the size modification of the display window 5 caused in response to the operation to the zoom button 7d.

The graphics device 24, for example a graphics accelerator for displaying, connected to the display 3, is driven by the graphics driver 20. In communication with the graphics driver 20, the coordinates converter module 16 acquires data relating to display position and size of the display window 5 during the panning state.

The OS 21 is interposed between the coordinates converter module 16 and each of the drivers 17, 18, 19, and 20. In communication with the keyboard driver 17 and the pointing device driver 18, the coordinates converter module 16 acquires, through the OS 21, information relating to the presence or absence of an external keyboard, a virtual keyboard, and the pointing device 7h. In communication with the tablet driver 19 and the graphics driver 20, the coordinates converter module 16 acquires, through the OS 21, information relating the current orientation and the current resolution of the display window 5.

The shared memory 22 stores coordinates conversion information of the tablet 4. The coordinates converter module 16 accesses the shared memory 22, thereby acquiring the coordinate conversion information. The coordinates converter module 16 converts the coordinates of the tablet 4 during the modification of the orientation of the display window 5 and/or during the modification of the size of the display window 5.

Figure 17:
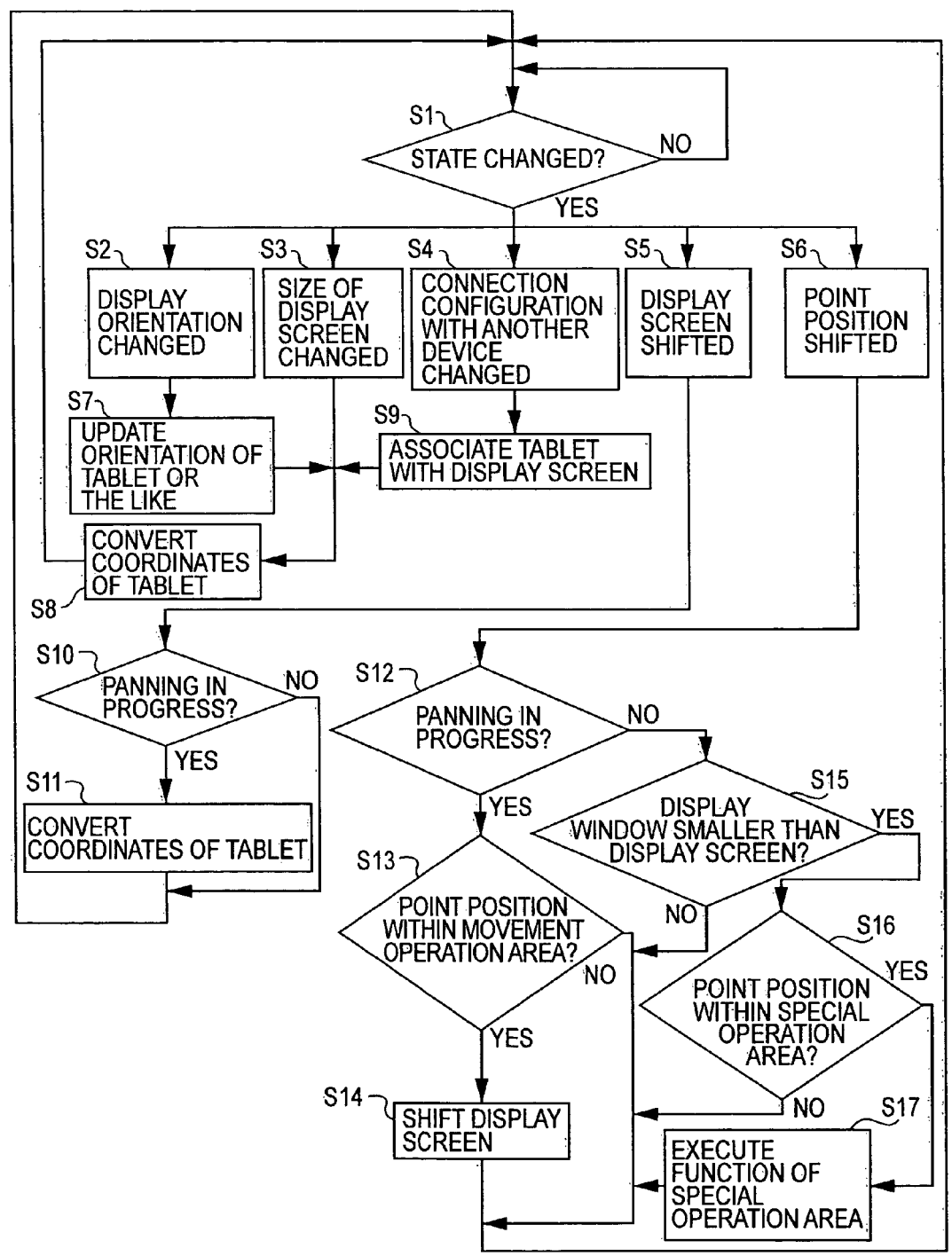
FIG. 17 is a flowchart illustrating the processes performed on the display window.

The above-referenced processes of the information processing apparatus 1 are described below with reference to a flowchart of FIG. 17.

The information processing apparatus 1 determines whether the state thereof has changed. More specifically, the information processing apparatus 1 determines whether the orientation of the display window 5 has been changed, whether the size of the display window 5 has been changed, whether the connection configuration to the other display has been changed, whether the display window 5 has been moved with respect to the display screen 6, or whether a point location has been changed in the tablet 4 (whether a tap position has been changed). If it is determined that any change in the state has occurred, the process proceeds to any of steps S2-S6. If it is determined that no change has occurred, the information processing apparatus 1 continuously detects a change in the state.

If it is determined in step S2 that the orientation of the display window 5 has been changed, the process proceeds to step S7.

If it is determined in step S3 that the size of the display window 5 has been changed, the process proceeds to step S8.

If it is determined in step S4 that the connection configuration with other displays has been changed, in other words that the number of connected displays has been changed, the process proceeds to step S9.

If it is determined in step S5 that the display window 5 has been moved with respect to the display screen 6, the process proceeds to step S10.

If it is determined in step S6 that the point position has been changed in the tablet 4, the process proceeds to step S12.

In step S7, the orientation and the movement direction of a device, namely, a keyboard cursor, the pointing device 7h, and the tablet 4, each associated with the displayed display window 5, are modified in accordance with the orientation of the display window 5. The process proceeds to step S8.

In step S8, coordinates of the tablet 4 are converted into a range of the display window 5 displayed on the display screen 6. After the coordinates conversion, the process returns to step S1.

In step S9, the tablet 4 is associated with one or more display windows 5. After the association, the process proceeds to step S8.

In step S10, the information processing apparatus 1 determines whether the display associated with the tablet 4 is in the panning state. If it is determined that the associated display is in the panning state, the process proceeds to step S11. If it is determined that the associated display is not in the panning state, the process returns to step S1.

In step S1, the coordinates of the tablet 4 are converted into a range of the display window 5 displayed in the display screen 6. After the coordinates conversion, the process returns to step S1.

In step S12, the information processing apparatus 1 determines whether the display associated with the tablet 4 is in a panning state. If it is determined that the associated display is in the panning state, the process proceeds to step S13. If it is determined that the associated display is not in the panning state, the process proceeds to step S15.

In step S13, the information processing apparatus 1 determines whether the point position is in the movement operation area. If it is determined that the point position is in the movement operation area, the process proceeds to step S14. If it is determined that the point position is not within the movement operation area, the process returns to step S1.

In step S14, the display window 5 is moved with respect to the display screen 6 at a movement speed responsive to the point position within the movement operation area. Upon completion of the movement, the process returns to step S1.

In step S15, the information processing apparatus 1 determines whether the size of the display window 5 is smaller than the size of the display screen in the display associated with the tablet 4. If it is determined that the size of the display window 5 is smaller than the size of the display screen 6, the process proceeds to step S16. If it is determined that the size of the display window 5 is not smaller than the size of the display screen 6, the process returns to step S1.

In step S16, the information processing apparatus 1 determines whether the point position is within the special operation area. If it is determined that the point position is within the special operation area, the process proceeds to step S17. If it is determined that the point position is not within the special operation area, the process returns to step S1.

In step S17, a function of the pointed special operation area is performed. Upon completion of this function, the process returns to step S1.

When the size of the display window 5 becomes larger than the size of the display screen 6 of the display 3 in the information processing apparatus 1, the movement operation area 13 for allowing the display window 5 to move is set up in the tablet 4. The movement of the display window 5 does not require the use of a relative coordinate pointing device such as a mouse. The user is thus freed from an inconvenient operation that the user changes the pointing device from the input pen to the mouse each time the display window 5 is moved. The ease of use of the information processing apparatus 1 is substantially enhanced.

Since the display 3 and the tablet 4 are integrated into one unitary unit in the information processing apparatus 1, the operation using the input pen on the display window 5 is interpreted as an operation to the tablet 4 when the display window 5 is moved. The ease of use and the reliability of operation are enhanced.

When the size of the display window 5 is smaller than the size of the display screen 6 of the display 3 in the information processing apparatus 1, the special operation area 15 is set up in the tablet 4 to perform the process on the display window 5. There are no areas that serve no purposes to the user. With the functions assigned to the special operation area 15, the user is free from an operation to newly open a window. The ease of use of the information processing apparatus 1 is further enhanced.

In the above-referenced embodiments, the display 3 and the tablet 4 are integrated into one unitary module in the information processing apparatus 1. The above-referenced embodiments are also applicable to a system that includes a display and a tablet separately arranged from the display.

The specific shapes and structures discussed with reference to the above-referenced embodiments have been discussed for exemplary purposes only, and are not to be construed as limiting the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
   a display having a display screen configured to display a display window; and
   a tablet having predetermined coordinates and permitting handwriting, a predetermined process being performed on the display window presented on the display in response to an operation on the tablet, a size of the display window being updatable, the coordinates of the tablet being converted in response to the size updating of the display window presented on the display screen, and upon a portion of the display window being hidden in response to the display window becoming larger in size than a maximum area of the display screen, a peripheral portion of the display window corresponding to the hidden portion of the display window being set as a movement operation area where the movement of the display window with respect to the display screen is controlled such that when the peripheral portion is selected, the display window is moved with respect to the display screen to display at least a part of the hidden portion of the display window.

2. The information processing apparatus according to claim 1, wherein the display and the tablet are integrated into a unitary module.

3. The information processing apparatus according to claim 1, wherein an orientation of the display window is modified with respect to the display and wherein an orientation of the coordinates of the tablet are updated in response to a change in the orientation of the display window.

4. The information processing apparatus according to claim 1, wherein a movement speed of the display window is updated in response to an operation position within the movement operation area of the tablet.

5. An information processing method of an information processing apparatus including a display having a display screen configured to display a display window, and a tablet having predetermined coordinates and permitting handwriting, presented on the display in response to an operation on the tablet, and a size of the display window being updatable, the information processing method comprising:

converting the coordinates of the tablet in response to the size updating of the display window presented on the display screen; and upon a portion of the display window being hidden in response to the display window becoming larger in size than a maximum area of the display screen, setting a peripheral portion of the display window corresponding to the hidden portion of the display window as a movement operation area where the movement of the display window with respect to the display screen is controlled such that when the peripheral portion is selected, the display window is moved with respect to the display screen to display at least a part of the hidden portion of the display window.

6. A computer readable medium including computer executable instructions, wherein the instructions, when executed by a processor, cause the processor to perform a method for operating an information processing apparatus including a display having a display screen configured to display a display window, and a tablet having predetermined coordinates and permitting handwriting, a predetermined process being performed on the display window presented on the display in response to an operation on the tablet, and a size of the display window being updatable, the method comprising:

converting the coordinates of the tablet in response to the size updating of the display window presented on the display screen; and upon a portion of the display window being hidden in response to the display window becoming larger in size than a maximum area of the display screen, setting a peripheral portion of the display window corresponding to the hidden portion of the display window as a movement operation area where the movement of the display window with respect to the display screen is controlled such that when the peripheral portion is selected, the display window is moved with respect to the display screen to display at least a part of the hidden portion of the display window.

7. An information processing apparatus comprising:

a display having a display screen configured to display a display window; and a tablet having predetermined coordinates and permitting handwriting, a predetermined process being performed on the display window presented on the display in response to an operation on the tablet, a size of the display window being updatable, the coordinates of the tablet being converted in response to the size updating of the display window presented on the display screen, and upon a portion of the display screen being left unfilled with the display window in response to the display window becoming smaller in size than a maximum area of the display screen, an empty portion of the display screen corresponding to the unfilled portion of the display screen being set as a special operation area that enables a predetermined process to be performed on the display window such that selecting empty portion activates the predetermined process, the empty portion of the display screen being a portion of the display screen that does not include the display window.

8. The information processing apparatus according to claim 7, wherein the special operation area of the tablet is divided into a plurality of partitions having different processes to be performed on the display window.

9. The information processing apparatus according to claim 7, wherein the unfilled portion of the tablet is configured to return back to an immediately preceding display window as the predetermined process when activated.

10. The information processing apparatus according to claim 7, wherein the unfilled portion of the tablet is configured to proceed to a next display window as the predetermined process when activated.

11. The information processing apparatus according to claim 7, wherein the unfilled portion of the tablet is configured to close the display window as the predetermined process when activated.

12. The information processing apparatus according to claim 7, wherein the unfilled portion of the tablet is configured to initiate a new software program as the predetermined process when activated.

13. The information processing apparatus according to claim 7, wherein the unfilled portion of the tablet is configured to scroll the display window with respect to the display screen as the predetermined process when activated.

14. An information processing method of an information processing apparatus including a display having a display screen configured to display a display window, and a tablet having predetermined coordinates and permitting handwriting, a predetermined process being performed on the display window presented on the display in response to an operation on the tablet, and a size of the display window being updatable, the information processing method comprising steps of:

converting the coordinates of the tablet in response to the size updating of the display window presented on the display screen; and upon a portion of the display window being left unfilled with the display window in response to the display window becoming smaller in size than a maximum area of the display screen, setting an empty portion of the display screen corresponding to the unfilled portion of the display screen as a special operation area that enables a predetermined process to be performed on the display window such that selecting empty portion activates the predetermined process, the empty portion of the display screen being a portion of the display screen that does not include the display window.

15. A computer readable medium including computer executable instructions, wherein the instructions, when executed by a processor, cause the processor to perform a method for operating an information processing apparatus including a display having a display screen configured to display a display window, and a tablet having predetermined coordinates and permitting handwriting, a predetermined process being performed on the display window presented on the display in response to an operation on the tablet, and a size of the display window being updatable, the method comprising:

converting the coordinates of the tablet in response to the size updating of the display window presented on the display screen; and upon a portion of the display window being left unfilled with the display window in response to the display window becoming smaller in size than a maximum area of the display screen, setting an empty portion of the display screen a corresponding to the unfilled portion of the display screen as a special operation area that enables a predetermined process to be performed on the display window such that selecting empty portion activates the predetermined process, the empty portion of the display screen being a portion of the display screen that does not include the display window.

* * * * *